US008840161B1

(12) United States Patent
Gardner

(10) Patent No.: US 8,840,161 B1
(45) Date of Patent: Sep. 23, 2014

(54) GAME HAULER

(71) Applicant: Charles Gardner, St Marys, GA (US)

(72) Inventor: Charles Gardner, St Marys, GA (US)

(*) Notice: Subject to any disclaimer, the term of this patent is extended or adjusted under 35 U.S.C. 154(b) by 0 days.

(21) Appl. No.: 14/152,111

(22) Filed: Jan. 10, 2014

(51) Int. Cl.
*A01M 31/00* (2006.01)
*B65G 7/12* (2006.01)

(52) U.S. Cl.
CPC .................................. *A01M 31/006* (2013.01)
USPC ........... 294/145; 294/151; 294/153; 294/165; 294/168

(58) Field of Classification Search
CPC ...................................................... A01M 31/06
USPC ........... 294/15, 137, 141, 145, 146, 151, 153, 294/156, 165, 168; 452/187, 189, 190; 224/921
See application file for complete search history.

(56) References Cited

U.S. PATENT DOCUMENTS

| | | | | |
|---|---|---|---|---|
| 2,796,210 A * | 6/1957 | Phillips | .......................... | 294/146 |
| 3,137,421 A * | 6/1964 | Haddock | ........................ | 224/103 |
| 3,194,599 A * | 7/1965 | Ambill | .......................... | 452/190 |
| 4,132,427 A | 1/1979 | McGee | | |
| 4,243,164 A | 1/1981 | Burlison et al. | | |
| 4,269,337 A * | 5/1981 | Sobotka | ........................ | 294/163 |
| 4,529,240 A | 7/1985 | Engel | | |
| 4,828,307 A * | 5/1989 | Sokol et al. | .................... | 452/192 |
| 5,326,147 A * | 7/1994 | Watson | ........................ | 294/162 |
| 5,901,999 A | 5/1999 | Brock | | |
| 5,951,080 A | 9/1999 | Wessner | | |
| 6,409,588 B1 * | 6/2002 | Womack et al. | ............... | 452/187 |
| 6,755,454 B1 | 6/2004 | Cary | | |
| 8,292,341 B1 | 10/2012 | Sokoly | | |
| 2006/0237980 A1 * | 10/2006 | Husing | .......................... | 294/137 |

* cited by examiner

*Primary Examiner* — Dean Kramer
(74) *Attorney, Agent, or Firm* — Lawrence J. Gibney, Jr.

(57) ABSTRACT

It is important to be able to drag a large animal through the woods after it has been killed. This device will allow the hunter to lift the animal's head above the ground as well as the legs in a pair of openings that will elevate the head of the animal off the ground surface so that the animal may be dragged. The handle may also telescope and will allow more than one hunter to grab the device in order to safely pull the animal through the woods.

4 Claims, 5 Drawing Sheets

GAME HAULER

BACKGROUND OF THE INVENTION

A. Field of the Invention

This device permits a hunter to move a large game that has been killed. Examples of the types of animals likely to be hauled include deer and wild hogs.

Once the animal is killed, the hunter must move the animal through woods with very limited lighting and often in areas which are obstructed under times extremes in environmental conditions. This device was contemplated that would make the transport of a large deer or large game animal practical without interfering with the ability of a hunter to move the animal through the woods.

B. Prior Art

There are many other prior references to game haulers and a represented example of this can be found in Burlison, U.S. Pat. No. 4,243,164.

Other examples include Wessner, U.S. Pat. No. 5,951,080, Brock, U.S. Pat. No. 5,901,999, and Engel, U.S. Pat. No. 4,529,0240.

The closest in terms of device structure is Burlison. However, the Burlison device has two separate attaching means for each of the legs of the animal.

This device improves upon Burlison by having one device that can securely lock the animal's hooves in place with one movement instead of attaching each leg separately.

Jagged edges around the interior of each of the openings as well as the wedge piece ensure that the animal's legs do not inadvertently slip out of one of the openings.

BRIEF SUMMARY OF THE INVENTION

This is a device that will allow the hunter to transport from the woods a large game animal after it has been killed.

The animal's front hooves will be placed in two openings which are jagged. A wedge piece will then securely lock the hooves in place. The wedge piece is then tightened using a tightening means.

There are many different types of means of connection and no particular method is being contemplated at this point.

To ensure that the animal's hooves will not inadvertently slip outside the openings, jagged edges are provided both on the openings as well as the wedge piece.

A handle is also provided that the hunter will grab in order to ensure that the animal's neck is above the ground, therefore making it is easier for the animal to be dragged. A lanyard is placed for the purpose of elevating the animal's head. The length of the lanyard is adjustable.

In operation the front legs of the animal are placed through the openings and the wedge piece tightens around a portion of the animal's legs. Using the handle, the hunter picks up the device and elevates the animal's head by securing it to the lanyard.

In this manner, the animal's head will not drag on the ground and allow the hunter to drag the animal.

Although no specific material is being claimed, because of the extremes in both temperature as well as environmental conditions, this device should be made of rugged, durable material.

NUMBERING DESCRIPTION

5—Device
7—Flat surface
10—Handle
15—Hoof opening
17—Handle opening
20—Wedge piece
25—Means of connection
27—Oblong opening
28—Jagged edge
30—Rope
35—Rope holes
40—Rope opening
41—Rope slots

DETAILED DESCRIPTION OF THE EMBODIMENTS

With this device, a large animal can be safely transported through the woods.

This device will be comprised of a flat surface 7 with a handle 10 with a handle opening 17 on the flat surface, into which the person would insert a hand. The hunter's hand can go through the handle opening 17 for ease of access. Different types of handles may be used.

Figure 1:
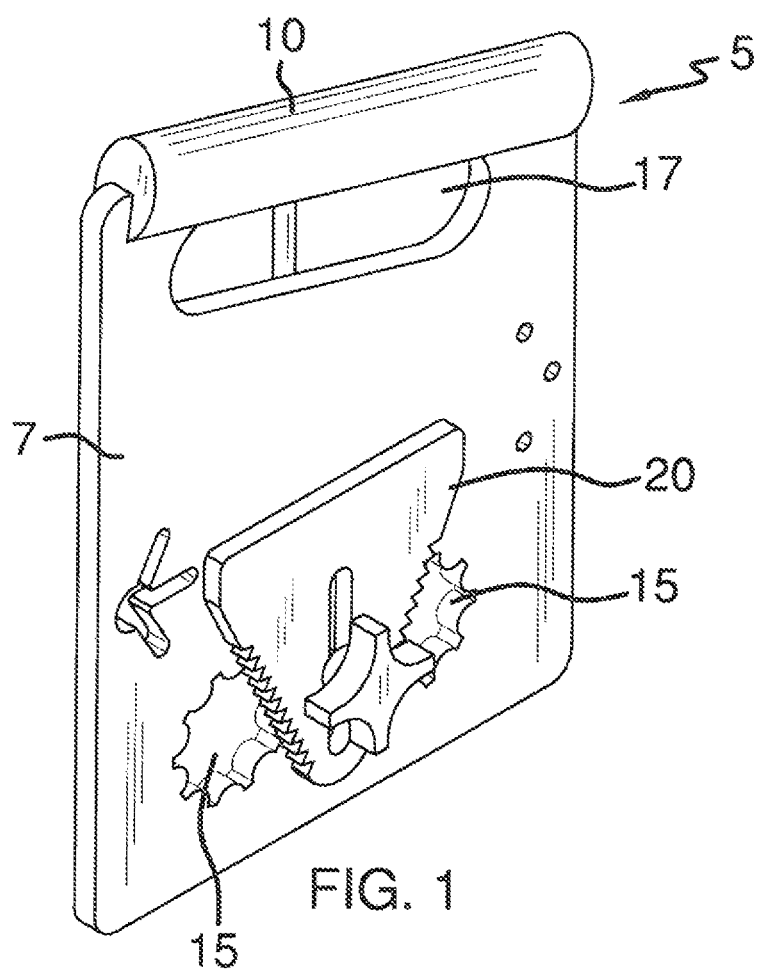
FIG. 1 is an isometric view of the device.
Figure 2:
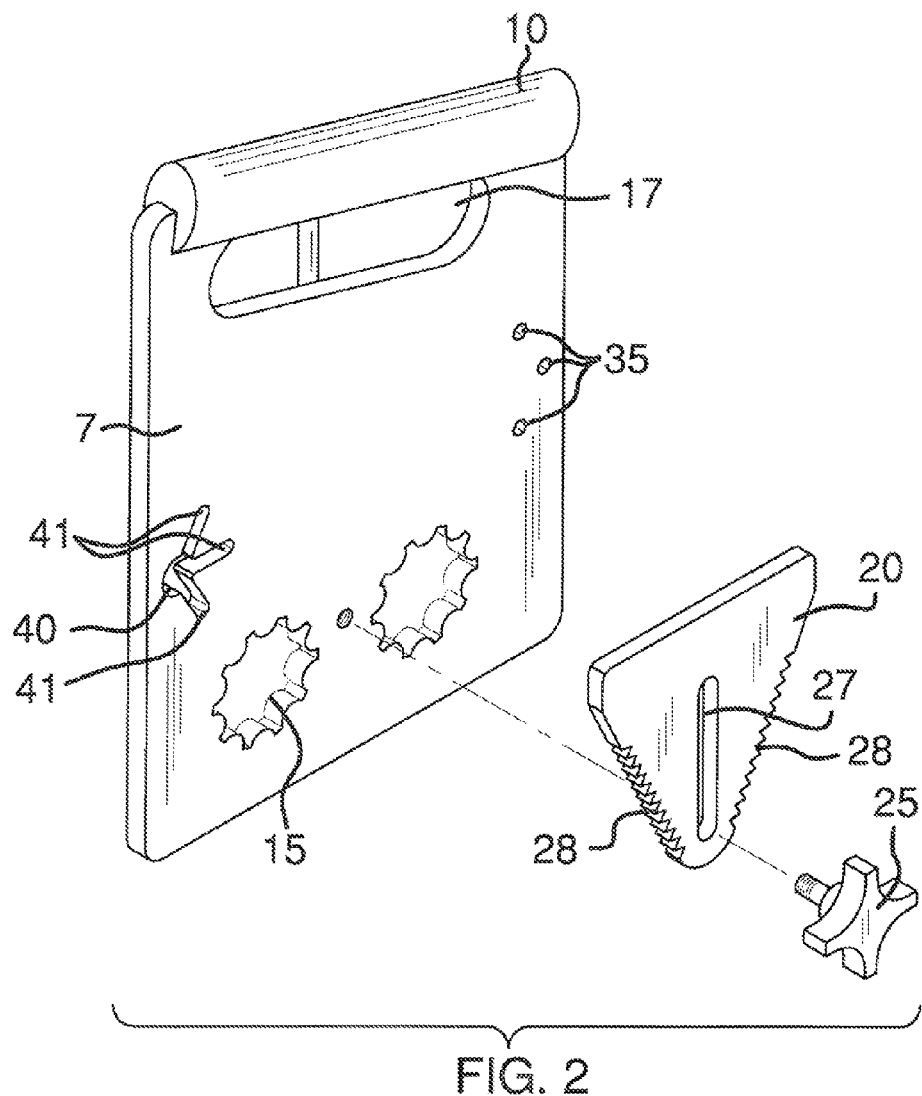
FIG. 2 is an exploded isometric view of the device.
Figure 4:
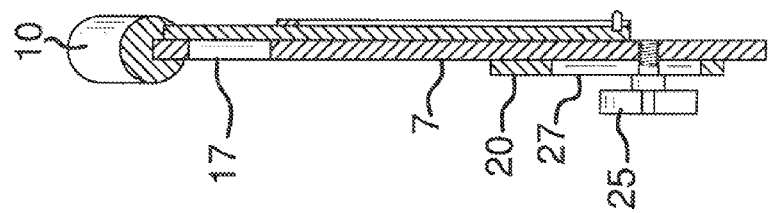
FIG. 4 is a side view according to Line 4-4 on FIG. 3.
Figure 3:
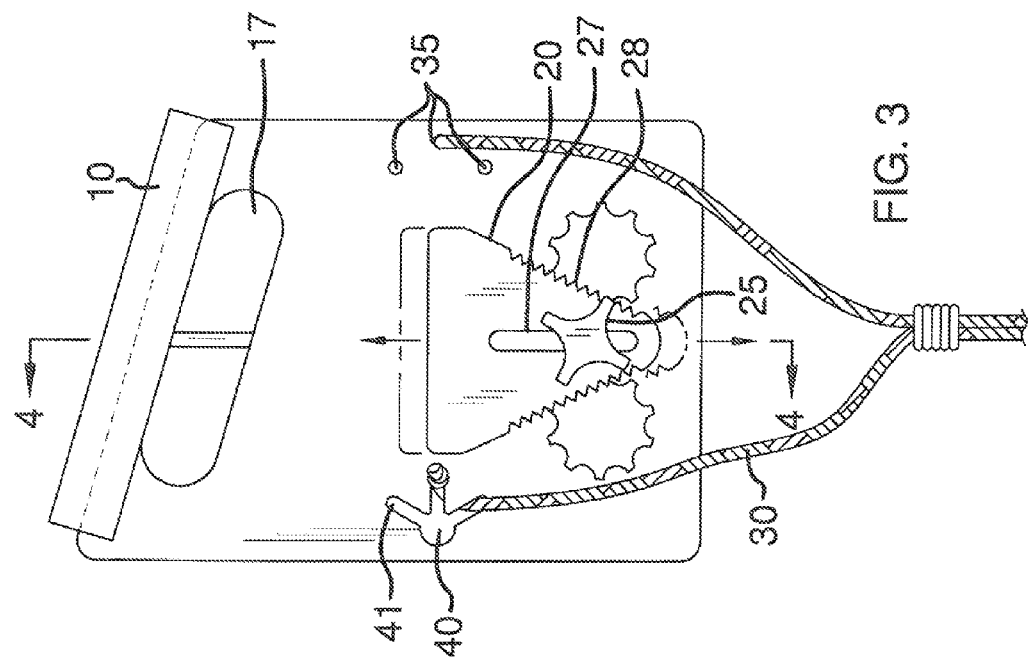
FIG. 3 is a front view of the device.
Figure 6:
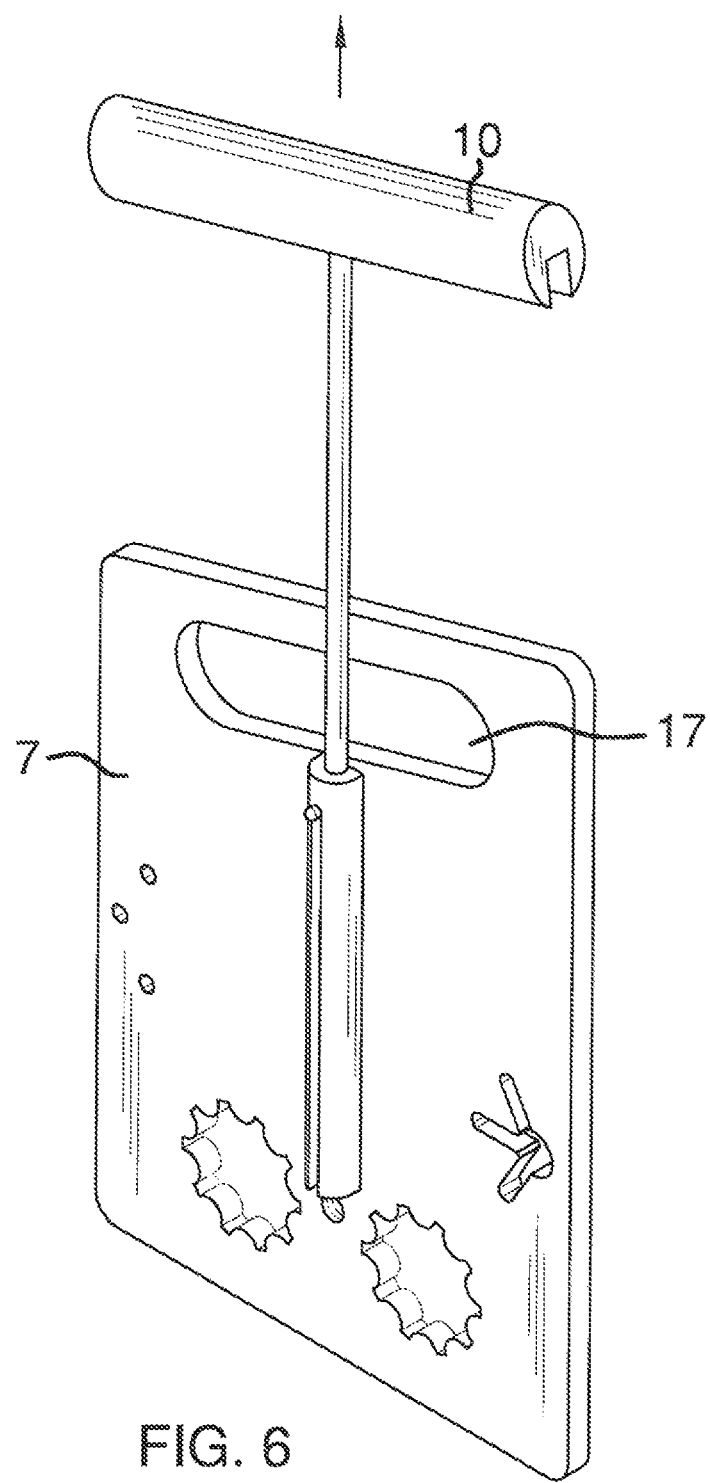
FIG. 6 is a back view of the device showing the telescoping handle.

The handle 10 may also telescope such as depicted in FIG. 6 so that more than one hunter can grab the device and pull a large animal through the woods or be slightly angled such as depicted in FIG. 3.

On the end opposite of the handle 10 will be two hoof openings 15, which are large enough to put the leg of an animal through each one. These hoof openings 15 will have jagged edges on the interior surface to ensure that the animal's hooves do not slip out of the hoof openings.

On the top surface 7 will be a wedge piece 20. This wedge piece 20 will have a jagged edge 28 on the outsides. The wedge piece will be secured to the device with the means of connection 25. An oblong opening 27 on the surface of the wedge piece will allow the wedge piece to move up and down on the top surface 7.

No specific means of connection is being used, but it should be made from durable material and should secure the hooves of the animal.

Figure 5:
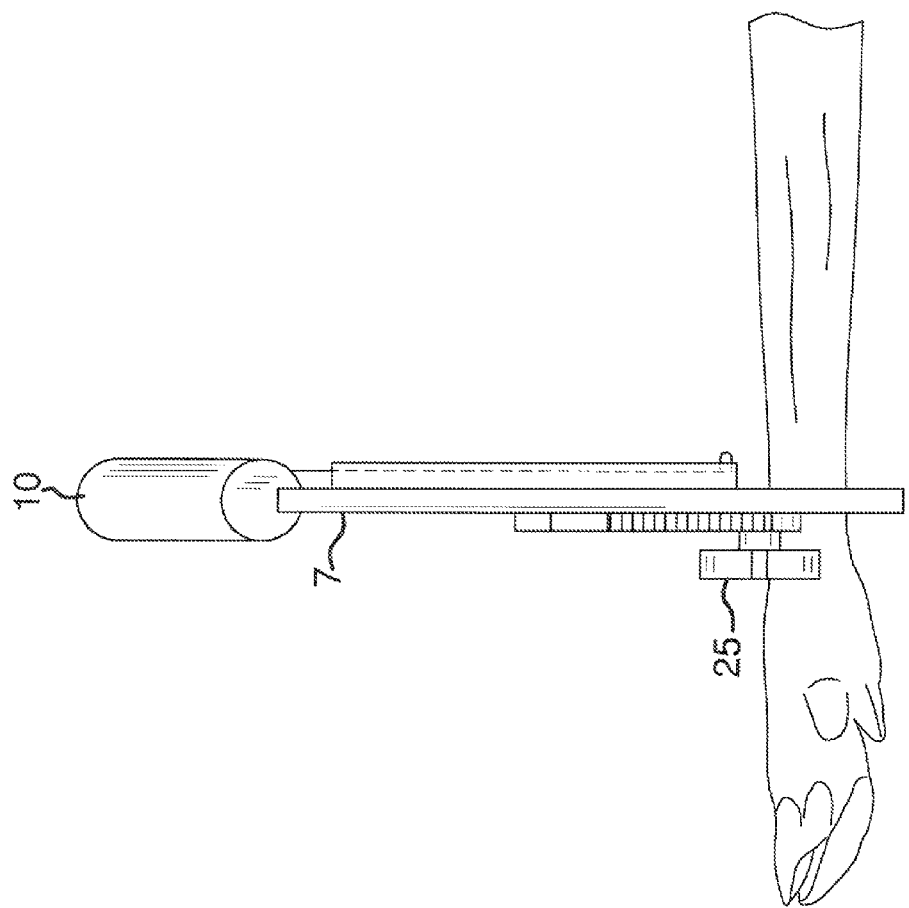
FIG. 5 is a side view of the device in use.

In using the device, a portion of the legs of the animal will be placed through the hoof openings such as depicted in FIG. 5. The wedge piece 20 will slide down until the animal's hooves are securely in place in the hoof openings 15. The means of connection 25 will then secure the wedge piece to the flat surface 7.

In order to ensure that the animal's head remains above the ground, in order to be able to transport the animal, an adjustable rope or lanyard 30 will be placed through the device in order to elevate the animal's head off the ground.

The length of the lanyard 30 can be adjusted by any variety of means and no specific means of adjustment is being claimed.

On the flat surface a plurality of rope holes 35 to secure a portion of the rope 30 are provided on the flat surface 7. On the opposite side of the flat surface 7 will be a rope opening 40 with a plurality of rope slots 41. A portion of the rope 30 is fed through the rope openings 40 and positioned in one of the rope slots 41. A knot that is made in the rope will insure that the rope remains secured to the device.

The rope 30 is used to raise the head of the animal above the ground surface for ease of transport.

The invention claimed is:

1. A game hauler which is comprised of:
   a. a flat surface;
   wherein the flat surface is a predetermined shape;
   b. a handle;
   wherein a handle opening is provided;
   c. a pair of hoof openings;
   wherein the hoof openings are a predetermined diameter;
   said hoof openings are large enough to place the hoof of the animal through the hoof opening;
   d. a wedge piece;
   said wedge piece is secured to the flat surface;
   wherein an oblong opening on the wedge piece is provided;
   wherein the wedge piece will move along the flat surface;
   e. means of connection;
   wherein the wedge piece can be locked in place on the flat surface using the means of connection;
   f. rope holes;
   wherein a plurality of rope holes is provided on the flat surface;
   g. a rope opening;
   wherein a plurality of rope slots of predetermined length are formed as part of the rope opening.

2. The game hauler as described in claim 1 wherein the interior surface of the hoof openings is serrated.

3. The game hauler as described in claim 1 wherein the handle telescopes.

4. The game hauler as described in claim 1 wherein the handle is positioned at an angle.

* * * * *